United States Patent Office 3,705,028
Patented Dec. 5, 1972

3,705,028
USE OF ARYLUREAS IN COMBATING WEEDS IN COTTON PLANTATIONS
Stefan Janiak, Basel, and Otto Rohr, Therwil, Switzerland, assignors to Ciba-Geigy AG
No Drawing. Filed Jan. 26, 1970, Ser. No. 5,951
Claims priority, application Switzerland, Feb. 6, 1969, 1,821/69
Int. Cl. A01n 9/20
U.S. Cl. 71—120    8 Claims

ABSTRACT OF THE DISCLOSURE

The use in combating weeds in cotton plantations of compounds of the formula

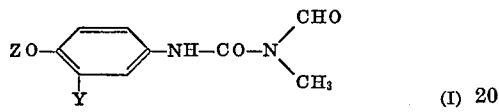

in which Z represents a $C_1$–$C_4$ alkyl radical, a $C_2$–$C_4$ alkenyl radical or a $C_2$–$C_4$ alkinyl radical and Y stands for a fluorine, chlorine, bromine or iodine atom or a trifluoromethyl radical.

---

This invention relates to the use of arylureas in combating weeds in cotton plantations. The aryl ureas used according to this invention have the formula

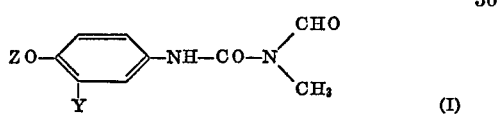

in which Z represents a $C_1$–$C_4$ alkyl radical, a $C_2$–$C_4$ alkenyl radical or a $C_2$–$C_4$ alkinyl radical and Y stands for a fluorine, chlorine, bromine or iodine atom or a trifluoromethyl radical.

The alkyl, alkenyl or alkinyl radicals represents by Z may be branched or straight-chained, unsubstituted or substituted. The substituents are preferably alkoxy, —OH, —CN or halogen. The halogen atoms may be F, Cl, Br or I atoms.

For the purposes of this invention, preferred alkyl, alkenyl and alkinyl radicals are for example methyl, ethyl, propyl, isopropyl, butyl, isobutyl, secondary butyl, tertiary butyl, allyl, methallyl, chlorallyl, methylpropenyl, propinyl or isobutinyl.

Compounds of the formula

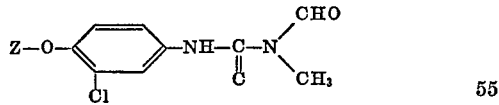

and

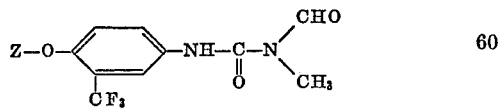

in which Z has the meaning given for Formula I are of particular importance.

Example of such compounds are, inter alia

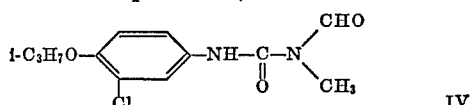    IV

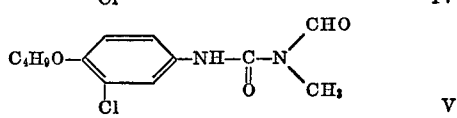    V

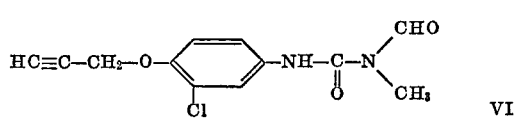    VI

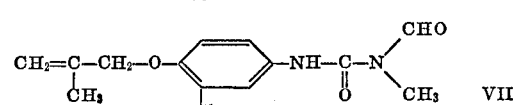    VII

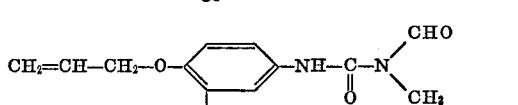    VIII

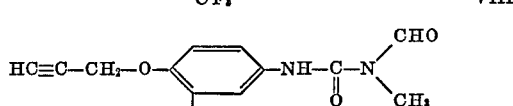    IX

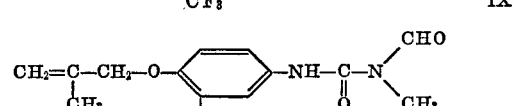    X

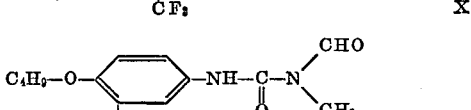    XI

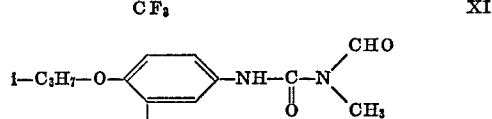    XII

The compounds of the Formula I to be used according to this invention are prepared in per se conventional manner, for example by reacting a phenyl-isocyanate of the formula

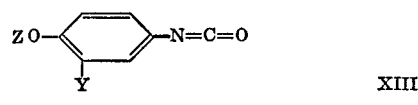    XIII in which Z and Y have the meanings first above stated, with a formylamine of the formula

    XIV

The reaction is preferably performed in an inert solvent, such as toluene, xylene, etc. at a temperature of about 100° C.

The quantities used in combating weeds in cotton plantations may vary within wide limits, for example between 0.1 to 10 kg. of active substance per hectare, preferably between 0.5 to 5 kg. per hectare.

The compounds of the Formula I may be used alone or in conjunction with a suitable carrier and/or other additive.

Suitable carriers or additives may be solid or liquid, and correspond to the substances commonly used in formulation technique, as for example, natural or regenerated mineral substances, solvents, diluents, dispersing agents, emulsifiers, wetting agents, adhesives, thickeners or fertilizers.

There may be added to such ureas—either to increase its action or to widen its range of usefulness other substances having a herbicidal action. Such substances are for example:

(A) Ureas

N-phenyl-N'-N'-dimethylurea
N-4-chlorophenyl-N'-N'-dimethylurea
N-3,4-dichlorophenyl-N'-N'-dimethylurea
N-4-chlorophenyl-N'-methoxy-N'-methylurea
N-3,4-dichlorophenyl-N'-methoxy-N'-methylurea
N-4-bromophenyl-N'-methoxy-N'-methylurea
N-4-bromo-3-chlorophenyl-N'-methoxy-N'-methylurea
N-4-chlorophenyl-N'-methyl-N'-butylurea
N-4-chlorophenyl-N'-methyl-N'-isobutylurea
N-(4-chlorophenoxyphenyl)-N',N'-dimethylurea

(B) Substituted triazines 2-chloro-4,6-bis(ethylamino)-s-triazine
2-chloro-4-ethylamino-6-isopropylamino-s-triazine
2-chloro-4,6-bis(methoxypropylamino)-s-triazine
2-methoxy-4,6-bis(isopropylamino)-s-triazine
2-diethylamino-4-isopropylacetamido-6-methoxy-s-triazine
2-isopropylamino-4-methoxyethylamino-6-methylmercapto-s-triazine
2-methylmercapto-4,6-bis(isopropylamino)-s-triazine
2-methylmercapto-4,6-bis(ethylamino)-s-triazine
2-methylmercapto-4-ethylamino-6-isopropylamino-s-triazine
2-methoxy-4,6-bis(ethylamino)-s-triazine
2-methoxy-4-ethylamino-6-isopropylamino-s-triazine
2-chloro-4,6-bis(isopropylamino)-s-triazine

(C) Phenols dinitro-secondary butylphenol or salts thereof
pentachlorophenol or salts thereof

(D) Carboxylic acids 2,3,6-trichlorobenzoic acid and salts thereof
2,3,5,6-tetrachlorobenzoic acid and salts thereof
2-methoxy-2,5,6-trichlorobenzoic acid and salts thereof
2-methoxy-3,6-dichlorobenzoic acid and salts thereof
2-amino-2,5-dichlorobenzoic acid and salts thereof
3-nitro-2,5-dichlorobenzoic acid and salts thereof
2-methyl-3,6-dichlorobenzoic acid and salts thereof
2,4-dichlorophenoxyacetic acid and salts and esters thereof
2,4,5-trichlorophenoxy acetic acid and salts and esters thereof
(2-methyl-4-chlorophenoxy)acetic acid and salts and esters thereof
2-(2,4,5-trichlorophenoxy)propionic acid and salts and esters thereof
2-(2,4,5-trichlorophenoxy)ethyl-2,2-dichloropropione
4-(2,4-dichlorophenoxy)butyric acid and salts and esters thereof
4-(2-methyl-4-chlorophenoxy)butyric acid and salts and esters thereof

(E) Carbamic acid derivatives carbanilic acid-isopropyl ester
m-chloro-carbanilic acid-isopropyl ester
m-chloro-carbanilic acid 4-chloro-2-butinyl ester
m-trifluoromethyl-carbanilic acid-isopropyl ester

(F) Various compounds 2,3,6-trichlorophenylacetic acid
chloracetic acid-diallylamide
maleic acid hydrazide
methylarsonic acid-di-sodium salt
borates
3-amino-triazene
pyrazine derivatives, such as pyramine
endooxohexahydrophthalic acid
diphenylacetonitrile
treflan
balan
planavin
tetrachlorophthalic acid-dimethyl ester
4-trifluoromethyl-2,4'-dinitro-diphenyl ether
2,4-dichloro-4'-nitro-diphenyl ether
3-cyclohexyl-6-methyluracil
3-cyclohexyl-6-secondary butyluracil
3-cyclohexyl-5-bromouracil
3-cyclohexyl-5-chlorouracil
3-isopropyl-5-chlorouracil
3-isopropyl-5-bromouracil and other known uracils.

These agents can be used in the form of solutions, emulsions, suspensions, granules or dusting agents. The mode of application depends entirely on the purpose for which the agents are used. Yet in each form of application, the active substance must be finely distributed. It is possible, particularly in the cases of dessication and defoliation, to heighten the effect by the use of per se phytotoxic carrier substances, as for example high boiling mineral oil fractions or chlorinated hydrocarbons; on the other hand, the selectivity in growth inhibition is more pronounced when carriers are used which are inert towards plants, for example in the selective combating of weeds.

In making solutions there may be used solvents, such as in particular alcohols, for example ethanol or isopropanol, ketones, such as acetone or cyclohexanone, aliphatic hydrocarbons, such as kerosene, and cyclic hydrocarbons, such as benzene, toluene, xylene, tetrahydronaphthalene, alkylated naphthalenes, also chlorinated hydrocarbons, such as tetrachlorethane, ethylene chloride, and finally, mineral and vegetable oils, and mixtures of the aforementioned substances.

The aqueous preparations are mainly emulsions and dispersions. The agents or solutions thereof in one of the aforementioned solvents are homogenized in water, preferably by means of wetting or dispersing agents. Examples of cationic emulsifiers or dispersants are quaternary ammonium compounds, whereas examples of anionic ones are soap, soft soap, aliphatic long-chained sulfuric acid monoesters, aliphatic aromatic sulfonic acids, long-chained alkoxyacetic acids, and examples of non-ionic ones are polyethylene ethers of fatty alcohols and polyethyleneoxy condensation products. Alternatively, concentrates consisting of active substance, emulsifier or dipersant, and optionally also solvent can be made and diluted with water before they are used.

Dusting agents can be prepared by mixing or conjointly grinding the active substance with a solid carrier. The latter may be talcum, diatomaceous earth, kaolin, bentonite, calcium carbonate, boric acid, tricalcium phosphate, also wood meal, cork meal, carbon or other material of vegetable origin. The substances may as well as incorporated in the carrier by means of a volatile solvent.

Powdery preparations and pastes can be rendered suspendible in water and adapted to the use as spray by adding wetting agents and protective colloids.

In many cases it is of advantage to use granules to ensure even distribution of active substance over a prolonged period of time. Granules can be prepared by causing granulated material, for example attapulgite or $SiO_2$ to absorb a solution of the active substance in an organic solvent, and expelling the solvent. Another method of preparing them consists in mixing an active substance of the Formula I with a polymerizable compound, then polymerizing the mixture, the active substances not being polymerized, and the formation of granules being effected during polymerization.

The content of active substance in the afore-described agents is between 0.1 and 95%, but when the application takes place from an airplane or other suitable equipment, the concentration may be up to 99.5%, or even 100%.

EXAMPLE 1

36.9 grams of 4-isopropoxy-3-trifluoromethyl-phenyl-isocyanate and 150 ml. of dry toluene are placed in a flask equipped with a stirrer. At an internal temperature of 100° C., 9 g. of N-methyl-formamide are added dropwise while stirring. The batch is kept at this temperature overnight, then cooled to 5° C., and the product which has crystallized is filtered off with suction.

Yield, 46.1 g.
Melting point, 56–62° C.
Active substance 1.1

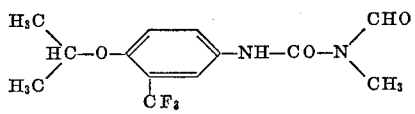

In an analogous manner the following ureas are prepared:

(b) Spraying powder

To obtain a spraying powder for example the following components are mixed and finely ground:

50 parts of active substance according to this invention
20 parts of highly adsorptive silicic acid
25 parts of bolus alba (kaolin)
1.5 parts of sodium 1-benzyl-2-stearyl-benzimidazole-6,3'-disulfonate
3.5 parts of the reaction product from para-tertiary octylphenol and ethylene oxide.

(c) Emulsion concentrate

Readily soluble active substances can also be formulated as emulsion concentrate according to the following prescription:

A mixture is prepared from 20 parts of active substance
70 parts of xylene
10 parts of a mixture of a reaction product of an alkylphenol with ethylene oxide and calcium dodecylbenzene sulfonate. On dilution with water to the desired concentration a sprayable emulsion is obtained.

(d) Granulate 7.5 grams of an active substance of the Formula I are dissolved in 100 ml. of acetone and the resulting acetonic solution added to 92 g. of granulated attapulgite (mesh size 24/48 mesh per inch). The whole is well mixed and the solvent expelled in a rotary evaporator. A granulate with a 7.5% content of active substance is obtained.

EXAMPLE 3

Herbicidal action

In a green house the following plants are sown: Gossypium, Digitaria, Poa, Alopecurus, Beta, Calendula, Chrysanthemum, Linum, Brassica, Ipomoea, Stellaria and Amaranthus.

|   |   | Melting point, °C. |
|---|---|---|
| 1.2 | $H_5C_2O-\langle\text{C}_6H_3(CF_3)\rangle-NH-CO-N(CHO)(CH_3)$ | 128–129 |
| 1.3 | $H_3C-O-\langle\text{C}_6H_3(CF_3)\rangle-NH-CO-N(CHO)(CH_3)$ | 128–130 |
| 1.4 | $H_3C-O-\langle\text{C}_6H_3(Cl)\rangle-NH-CO-N(CHO)(CH_3)$ | 130–132 |
| 1.5 | $H_5C_2-O-\langle\text{C}_6H_3(Cl)\rangle-NH-CO-N(CHO)(CH_3)$ | 85–87 |
| 1.6 | $CH_3OCH_2CH_2-O-\langle\text{C}_6H_3(Cl)\rangle-NH-CO-N(CHO)(CH_3)$ | 90–91 |

EXAMPLE 2

(a) Dusting agent

Equal parts of an active substance according to this invention and of precipitated silicic acid are finely ground. By mixing with kaolin or talcum, dusting agents with a preferred content of active substance of 1–6% can be prepared.

The post-emergent treatment of these plants was performed with a 1% aqueous solution of the active substances about 10–12 days after seeding, in the 2–3-leaf stage, using 1 or 2 kg. of active substance per hectare, respectively. The plants were examined about 20 days after treatment and the results stated in Table I were found.

Pre-emergent treatment was performed with 2 kg. or 4 kg. of active substance per hectare as early as 24 hours after seeding; for results, see Table II.

Ratings:
- 1–3 = plants unharmed or hardly harmed
- 4–5 = medium damage
- 6–8 = heavy damage
- 9 = plant killed

TABLE I.—POST-EMERGENCE TREATMENT

| Plant: | Active substance No. | | |
|---|---|---|---|
| | 1.1 | 1.2 | 1.5 |
| | 1 kg./ha. | 2 kg./ha. | 2 kg./ha. |
| Gossypium | 2 | 2 | 2 |
| Digitaria | 7 | 5 | |
| Poa | 9 | 6 | |
| Alopecurus | 7 | 5 | 6 |
| Beta | 9 | 9 | 8 |
| Calendula | 9 | 9 | 9 |
| Chrysanthemum | | | 9 |
| Linum | 9 | 8 | |
| Brassica | 8 | 7 | |
| Ipomoea | 9 | 9 | 9 |
| Stellaria | 9 | 9 | 9 |
| Amaranthus | 8 | 9 | 9 |

TABLE II.—PRE-EMERGENCE TREATMENT

| Plant: | Active substance No. | | | | |
|---|---|---|---|---|---|
| | 1.1 | 1.2 | 1.3 | 1.4 | 1.5 |
| | 2 kg./ha. | 4 kg./ha. | 4 kg./ha. | 2 kg./ha. | 2 kg./ha. |
| Gossypium | 1 | 1 | 1 | 1 | 1 |
| Digitaria | | 6 | 7 | 9 | 9 |
| Poa | | | 7 | 8 | 6 |
| Alopecurus | 6 | 6 | 5 | 7 | 5 |
| Beta | 9 | 9 | 9 | 9 | 9 |
| Calendula | | 9 | 5 | 9 | 9 |
| Chrysanthemum | | 6 | 9 | 9 | 9 |
| Linum | | 7 | 9 | 6 | 9 |
| Brassica | 6 | 9 | 6 | 8 | 9 |
| Ipomoea | 9 | 9 | 9 | 9 | 9 |
| Stellaria | 9 | 9 | 9 | 9 | 9 |
| Amaranthus | 8 | 9 | 9 | 9 | 9 |

What is claimed is:

1. A method for combatting weeds in cotton plantations comprising applying thereto a herbicidally effective amount of a compound of the formula:

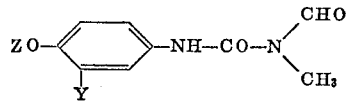

in which Z represents alkyl of from 1 to 4 carbon atoms and Y represents chlorine or trifluoromethyl.

2. A method according to claim 1 in which the compound has the formula:

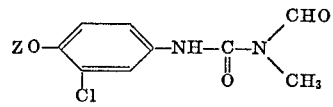

3. A method according to claim 1 in which the compound has the formula:

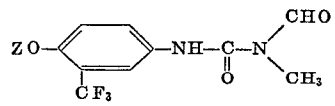

4. The method according to claim 3 in which the compound is

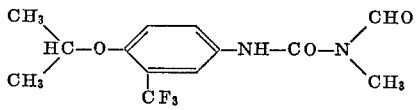

5. The method according to claim 3 in which the compound is

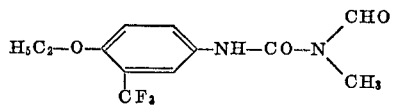

6. The method according to claim 3 in which the compound is

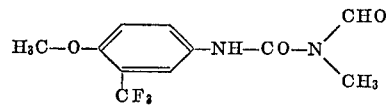

7. The method according to claim 2 in which the compound is

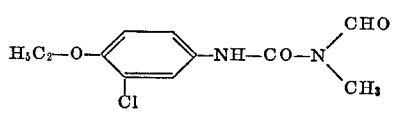

8. The method according to claim 2 in which the compound is

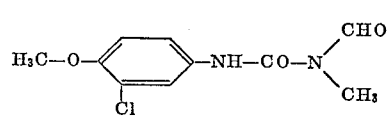

References Cited

FOREIGN PATENTS 4,316,475  11/1968  Japan _____ 71—120
784,769  5/1968  Canada _____ 71—120

LEWIS GOTTS, Primary Examiner

C. L. MILLS, Assistant Examiner

U.S. Cl. X.R.

71—79; 260—553 A